(12) United States Patent
Kuo (10) Patent No.: US 9,076,498 B1
(45) Date of Patent: Jul. 7, 2015

(54) MOBILE HARD DISK DRIVE

(71) Applicant: ADLINK TECHNOLOGY INC., New Taipei (TW)

(72) Inventor: Jen-Chieh Kuo, New Taipei (TW)

(73) Assignee: Adlink Technology Inc., New Taipei (TW)

(*) Notice: Subject to any disclaimer, the term of this patent is extended or adjusted under 35 U.S.C. 154(b) by 0 days.

(21) Appl. No.: 14/221,458

(22) Filed: Mar. 21, 2014

(51) Int. Cl.
*G11B 17/00* (2006.01)
*G11B 33/02* (2006.01)

(52) U.S. Cl.
CPC .................... *G11B 33/025* (2013.01)

(58) Field of Classification Search
CPC ......... G11B 17/00; G11B 5/012; G11B 33/14
USPC ............. 360/99.2, 99.12, 99.08, 99.21, 99.18
See application file for complete search history.

(56) References Cited

U.S. PATENT DOCUMENTS

2002/0012227 A1\* 1/2002 Sa et al. .................... 361/683

\* cited by examiner

*Primary Examiner* — Allen T Cao
(74) *Attorney, Agent, or Firm* — Rosenberg, Klein & Lee (57) ABSTRACT

A mobile hard disk drive includes an electrical module including a circuit board, a face panel and a holder box, and a hard disk tray detachably insertable through an insertion slot in the face panel into a receiving chamber in the holder box to force arched spring plates thereof into friction engagement with two opposite inner lateral walls in the receiving chamber of the holder box and lockable to the face panel by two hand screws that are mounted at an end plate of the hard disk tray for threading into respective locating screw holes at the face panel to lock the hard disk tray to the face panel of the electrical module.

7 Claims, 7 Drawing Sheets

MOBILE HARD DISK DRIVE

BACKGROUND OF THE INVENTION

1. Field of the Invention

The present invention relates to hard disk drive technology and more particularly, to a mobile hard disk drive, which comprises an electrical module formed of a circuit board, a face panel and a holder box, and a hard disk tray detachably insertable through an insertion slot in the face panel into a receiving chamber in the holder box to force arched spring plates thereof into friction engagement with two opposite inner lateral walls in the receiving chamber of the holder box.

2. Description of the Related Art

Figure 7:
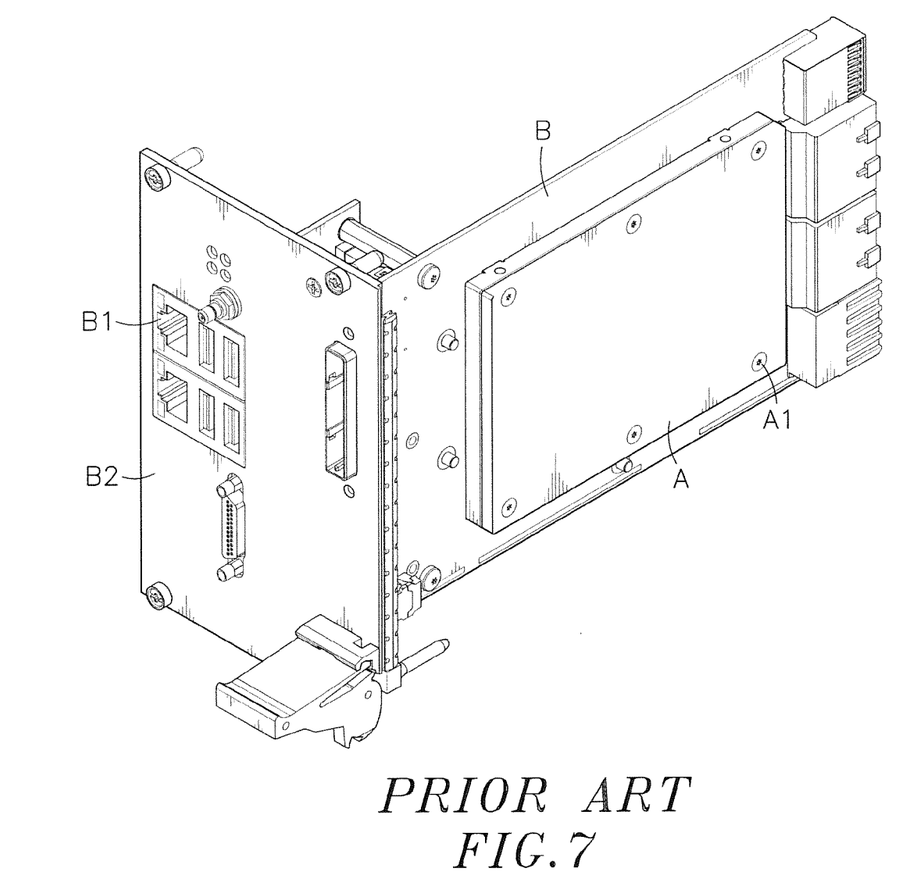
FIG. 7 is an oblique top elevational view of a mobile hard disk drive according to the prior art.

Following fast development of technology, advanced electronic and electrical products have been continuously created to serve people, bringing convenience to people and help people to improve working efficiency. More particularly, computer is practical for word processing, graphic preparation, Internet communication, data search, creating accessible forms, computing, and many other functions. Nowadays, computer has been widely used everywhere for different applications. Further, a computer system generally provides a hard disk for storing data. However, a hard disk has its data storage capacity limit. When the data storage capacity of a hard disk in a computer is fully occupied, the user may need to replace the hard disk with a new one for storing other data or for making a copy. FIG. 7 illustrates the mounting arrangement of a conventional hard disk drive. As illustrated, the hard disk drive comprises a circuit board B, a hard disk A affixed to the circuit board B with screws A1, and a face panel B2 mounted at one end of the circuit board B and carrying a plurality of electrical connectors B1 that are electrically connected to the circuit board B. According to this design of hard disk drive, the hard disk A, the circuit board B and the face panel B2 are fixedly fastened together. When going to replace the hard disk A, the hard disk drive must be dismounted from the computer, allowing the hard disk A to be dismounted from the circuit board B for a replacement. After installation of a new hard disk in the circuit board B, the circuit board B with the new hard disk and the face panel B2 are then mounted in the computer again. In actual application, this design of hard disk drive has drawbacks as summarized below:

1. Mounting the hard disk A in the circuit board B or mounting the circuit board B with the face panel B2 in a computer needs to use a hand tool, such as screwdriver, complicating the installation procedure and wasting much installation time and labor.

2. Frequently mounting and dismounting the hard disk A relative to the circuit board B, or frequently mounting and dismounting the circuit board B with the face panel B2 relative to the computer can cause the screws or screw holes to wear or to break, leading to connection instability.

3. After fixation of the hard disk A to the circuit board B, the hard disk A is kept in close contact with the surface of the circuit board B, hindering heat dissipation.

Therefore, it is desirable to provide a mobile hard disk drive, which facilitates hard disk replacement and heat dissipation, and assures a high level of connection stability.

SUMMARY OF THE INVENTION

The present invention has been accomplished under the circumstances in view. It is therefore one object of the present invention to provide a mobile hard disk drive, which facilitates hard disk replacement and heat dissipation, and assures a high level of connection stability.

To achieve this and other objects of the present invention, a mobile hard disk drive of the invention includes an electrical module including a circuit board, a face panel and a holder box, and a hard disk tray detachably insertable through an insertion slot in the face panel into a receiving chamber in the holder box to force arched spring plates thereof into friction engagement with two opposite inner lateral walls in the receiving chamber of the holder box and lockable to the face panel by two hand screws that are mounted at an end plate of the hard disk tray for threading into respective locating screw holes at the face panel to lock the hard disk tray to the face panel of the electrical module.

Preferably, the circuit board further comprises a plurality of mounting screw holes respectively located in corners thereof; the holder box further comprises a plurality of spacer columns respectively perpendicularly extended from a back side thereof and respectively attached to the mounting screw holes of the circuit board, a plurality of screw holes respectively extended through the spacer columns in communication with the respective mounting screw holes of the circuit board, and a plurality of screws respectively threaded into the screw holes in the spacer columns and the respective mounting screw holes of the circuit board to affix the circuit board and the holder box together. Thus, when the electrical module is assembled, the spacer columns are connected between the circuit board and the holder box, and an open space is defined between the circuit board and the holder box for heat dissipation.

DETAILED DESCRIPTION OF THE PREFERRED EMBODIMENT

Referring to FIGS. 1-4, a mobile hard disk drive in accordance with the present invention is shown. The mobile hard disk drive comprises an electrical module 1, and a hard disk tray 2.

The electrical module 1 comprises a circuit board 11, which comprises a circuit layout (not shown) arranged on one side thereof and a plurality of mounting screw holes 111 located in corners thereof, a face panel 12, which is connected to one end, namely, the front end of the circuit board 11 at right angles and comprises an insertion slot 120 cut through opposing front and back walls thereof and disposed adjacent to the front end of the circuit board 11, a plurality of transmission interfaces 121 mounted in the front wall and two locating screw holes 122 respectively disposed at opposing top and bottom sides relative to the insertion slot 120, and a holder box 13, which is mounted at one side of the circuit board 11 and comprises a receiving chamber 130 disposed in communication with the insertion slot 120 of the face panel 12, a plurality of spacer columns 131 respectively perpendicularly extended from a back side thereof and respectively attached to the mounting screw holes 111 of the circuit board 11, a plurality of screw holes 132 respectively extended through the spacer columns 131 in communication with the respective mounting screw holes 111 of the circuit board 11 and a plurality of screws 133 respectively threaded into the screw holes 132 in the spacer columns 131 and the respective mounting screw holes 111 of the circuit board 11 to affix the circuit board 11 and the holder box 13 together. When the electrical module 1 is assembled, the spacer columns 131 are connected between the circuit board 11 and the holder box 13, and thus an open space 110 is defined between the circuit board 11 and the holder box 13 for heat dissipation.

The hard disk tray 2 comprises an accommodation open chamber 20, a plurality of hook holes 21 arranged in pairs and symmetrically disposed at two opposite lateral sides of the accommodation open chamber 20, a plurality of arched spring plates 22 each having two hooked end portions 221 respectively hooked in two hook holes 21 of one respective pair, and an end plate 23 transversely disposed at a front side thereof, two hand screws 231 mounted near two distal ends of the end plate 23, and a handle 232 located at the end plate 23 between the two hand screws 231.

After threading the screws 133 into the screw holes 132 of the respective spacer columns 131 and the respective mounting screw holes 111 of the circuit board 11 to affix the circuit board 11 and the holder box 13 together, detachably insert the hard disk tray 2 through the insertion slot 120 of the face panel 12 into the receiving chamber 130 of the holder box 13 to force the arched spring plates 22 of the hard disk tray 2 into friction engagement with two opposite inner lateral walls 1301 in the receiving chamber 130 of the holder box 13 and to abut the end plate 23 of the hard disk tray 2 against the face panel 12 corresponding to the location of the insertion slot 120, and then manually thread the hand screws 231 of the hard disk tray 2 into the locating screw holes 122 of the face panel 12 to lock the hard disk tray 2 to the face panel 12 of the electrical module 1.

Figure 1:
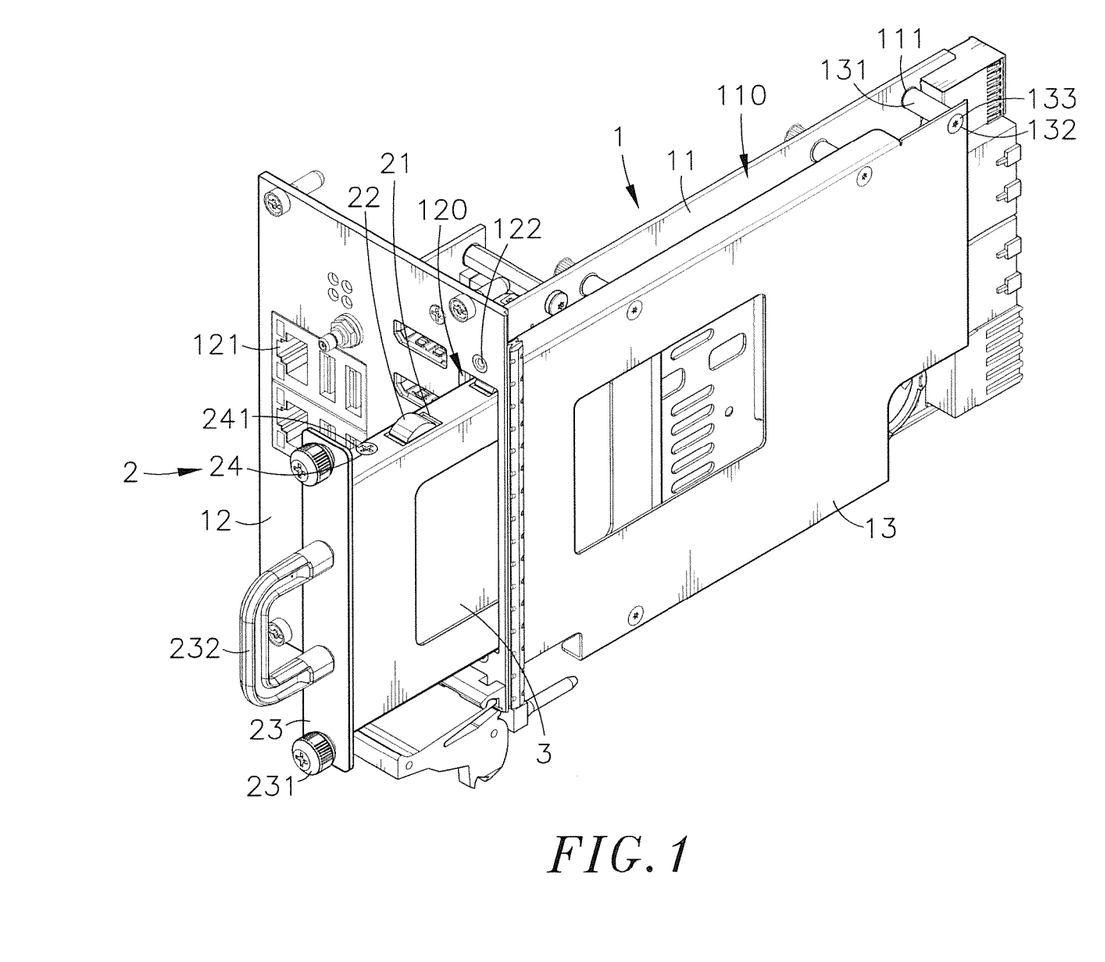
FIG. 1 is an oblique top elevational view of a mobile hard disk drive in accordance with the present invention.
Figure 2:
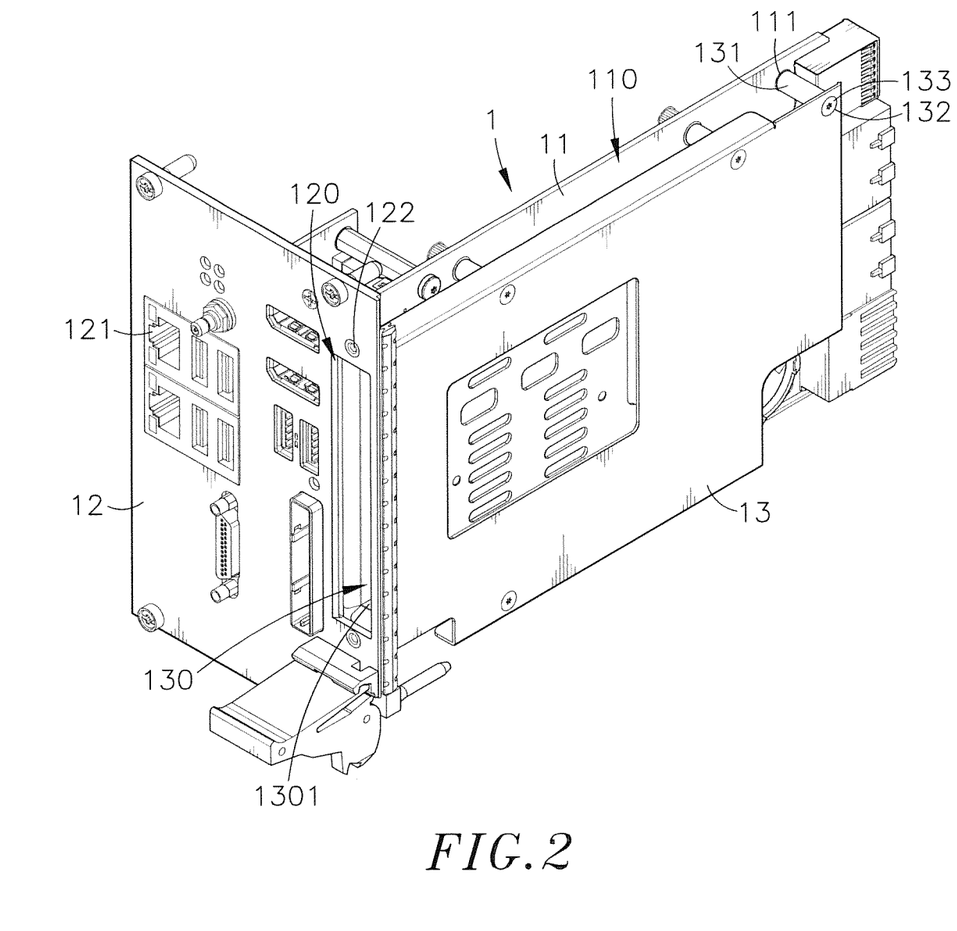
FIG. 2 is an oblique top elevational view of the electrical module of the mobile hard disk drive in accordance with the present invention.
Figure 3:
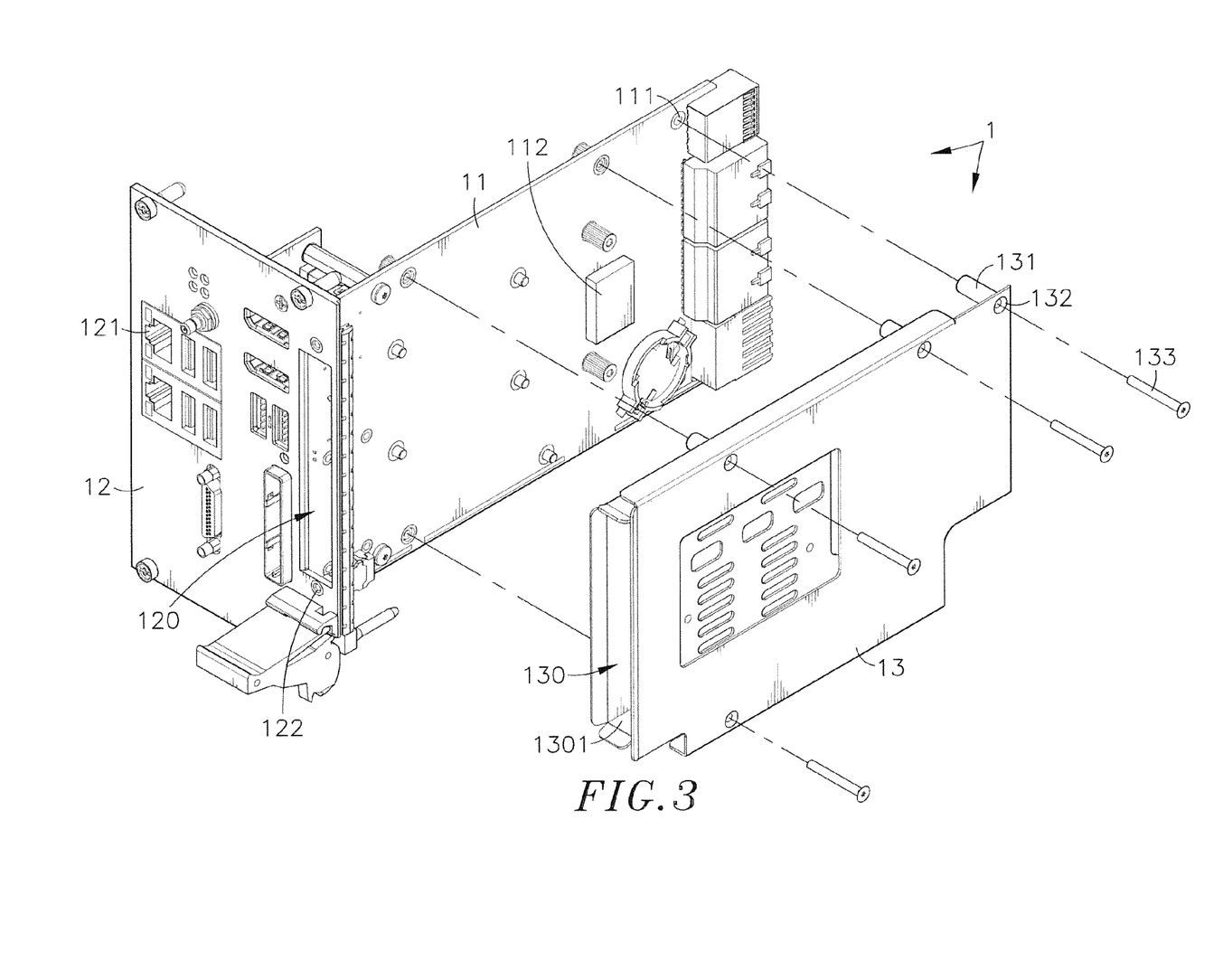
FIG. 3 is an exploded view of the electrical module of the mobile hard disk drive in accordance with the present invention.
Figure 4:
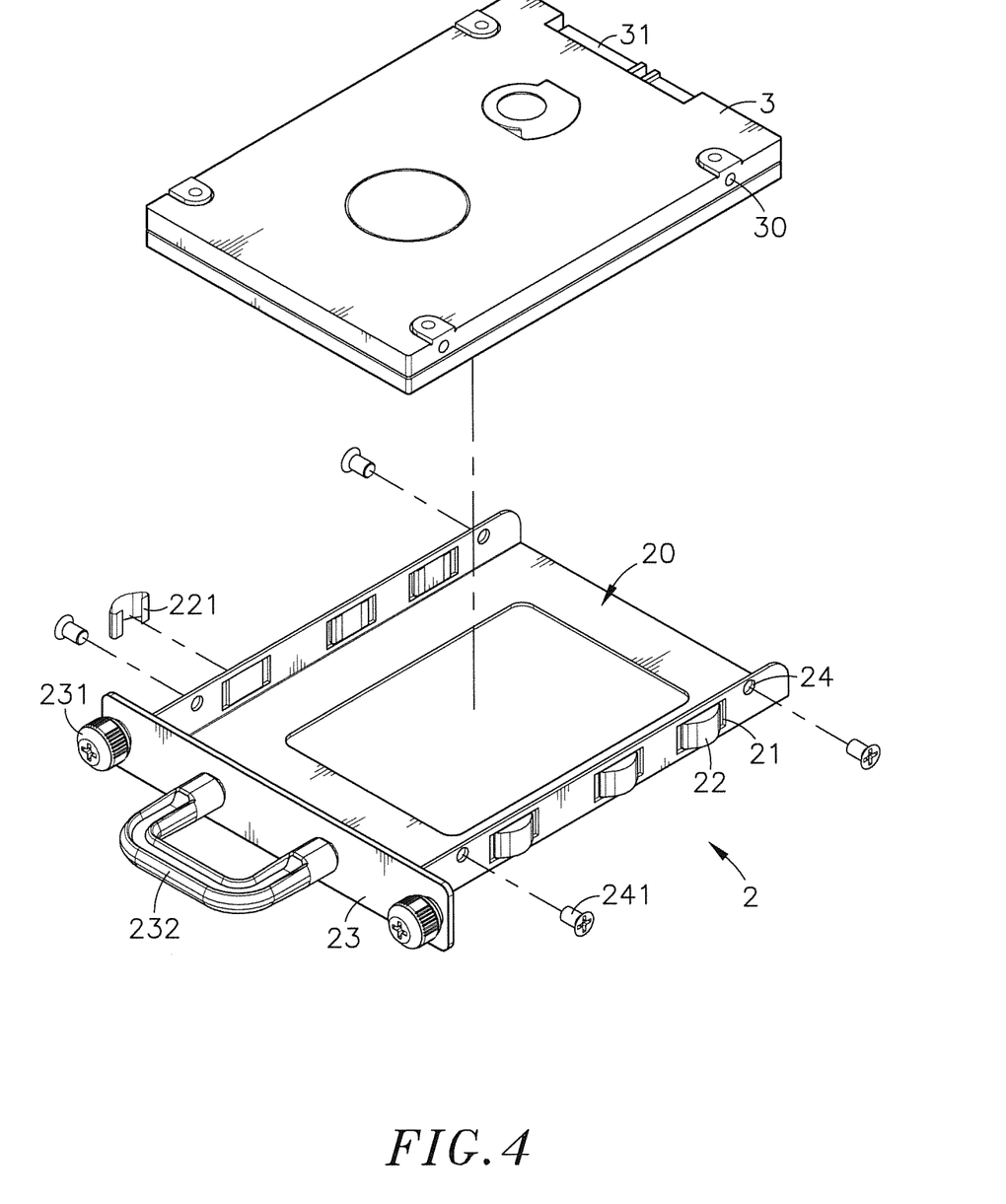
FIG. 4 is an exploded view of the hard disk tray of the mobile hard disk drive in accordance with the present invention.

Further, a hard disk 3 is accommodated in the accommodation open chamber 20 of the hard disk tray 2 and affixed thereto with screws 241 that are respectively threaded into respective mounting screw holes 24 at two opposite lateral sides of the hard disk tray 2 and respective mounting screw holes 30 at two opposite lateral sides of the hard disk 3. After installation of the hard disk 3 in the hard disk tray 2, the hard disk tray 2 is inserted through the insertion slot 120 of the face panel 12 into the receiving chamber 130 of the holder box 13 and then locked to the face panel 12 of the electrical module 1 by the hand screws 231. In application, the electrical module 1 is mounted in a computer to let the transmission interfaces 121 of the face panel 12 be electrically connected to respective mating adapter interfaces (not shown) in the computer for intercommunication between the circuit board 11 and hard disk 3 of the mobile hard disk drive and the computer. When going to replace the hard disk 3, loosen the hand screws 231 of the hard disk tray 2 from the respective locating screw holes 122 of the face panel 12 to unlock the hard disk tray 2 from the face panel 12 of the electrical module 1. At this time, the user can pull the handle 232 to separate the hard disk tray 2 from the holder box 13 of the electrical module 1. After replacement of a new hard disk tray, insert the hard disk tray 2 through the insertion slot 120 of the face panel 12 into the receiving chamber 130 of the holder box 13 to force the arched spring plates 22 of the hard disk tray 2 into friction engagement with two opposite inner lateral walls 1301 in the receiving chamber 130 of the holder box 13 again, and then manually thread the hand screws 231 of the hard disk tray 2 into the locating screw holes 122 of the face panel 12 to lock the hard disk tray 2 to the face panel 12 of the electrical module 1. Thus, the invention facilitates quick replacement of hard disk 3.

Figure 5:
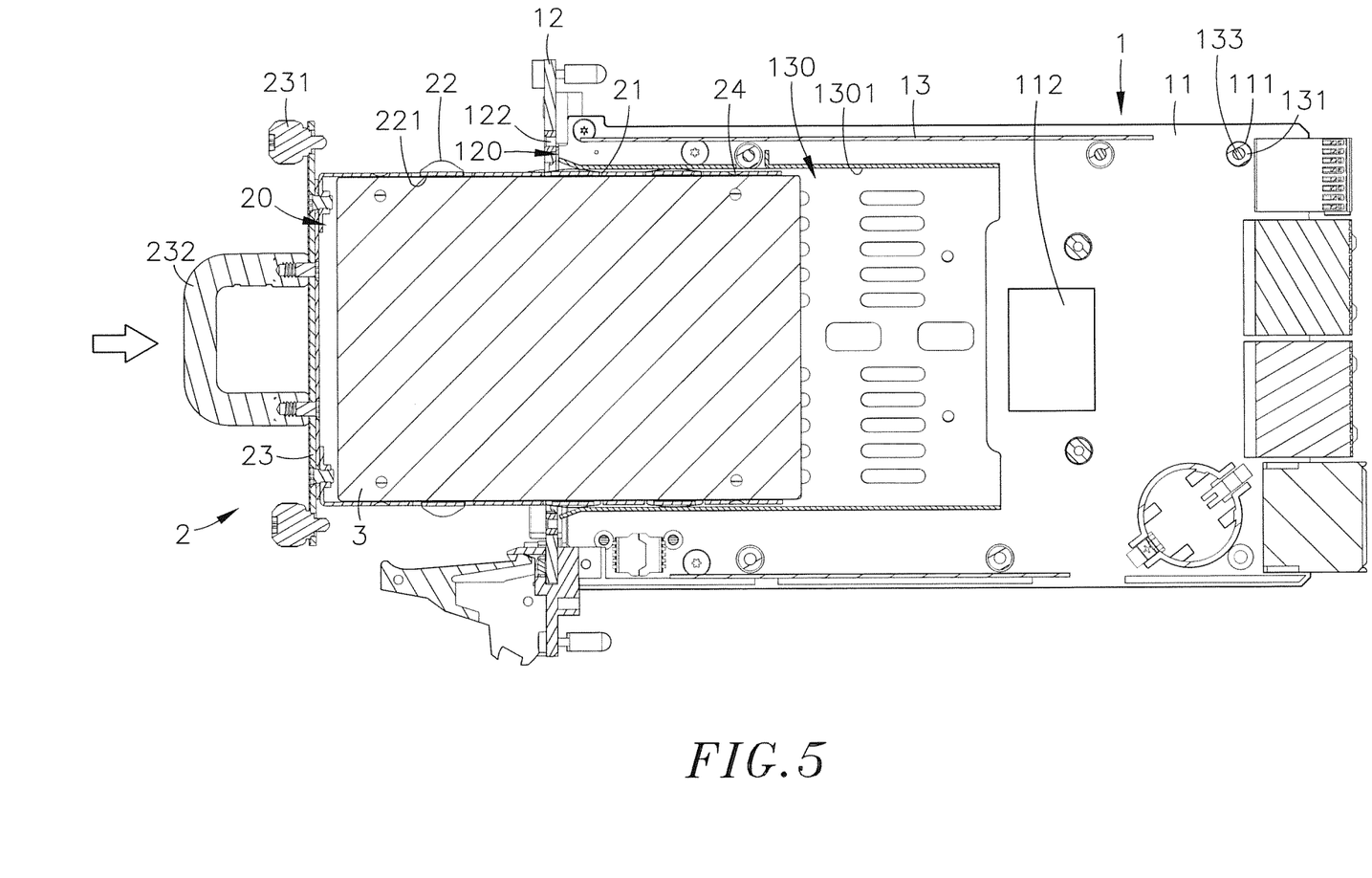
FIG. 5 is a sectional side view of the present invention, illustrating the hard disk tray partially inserted through the insertion slot of the face panel into the receiving chamber of the holder box.
Figure 6:
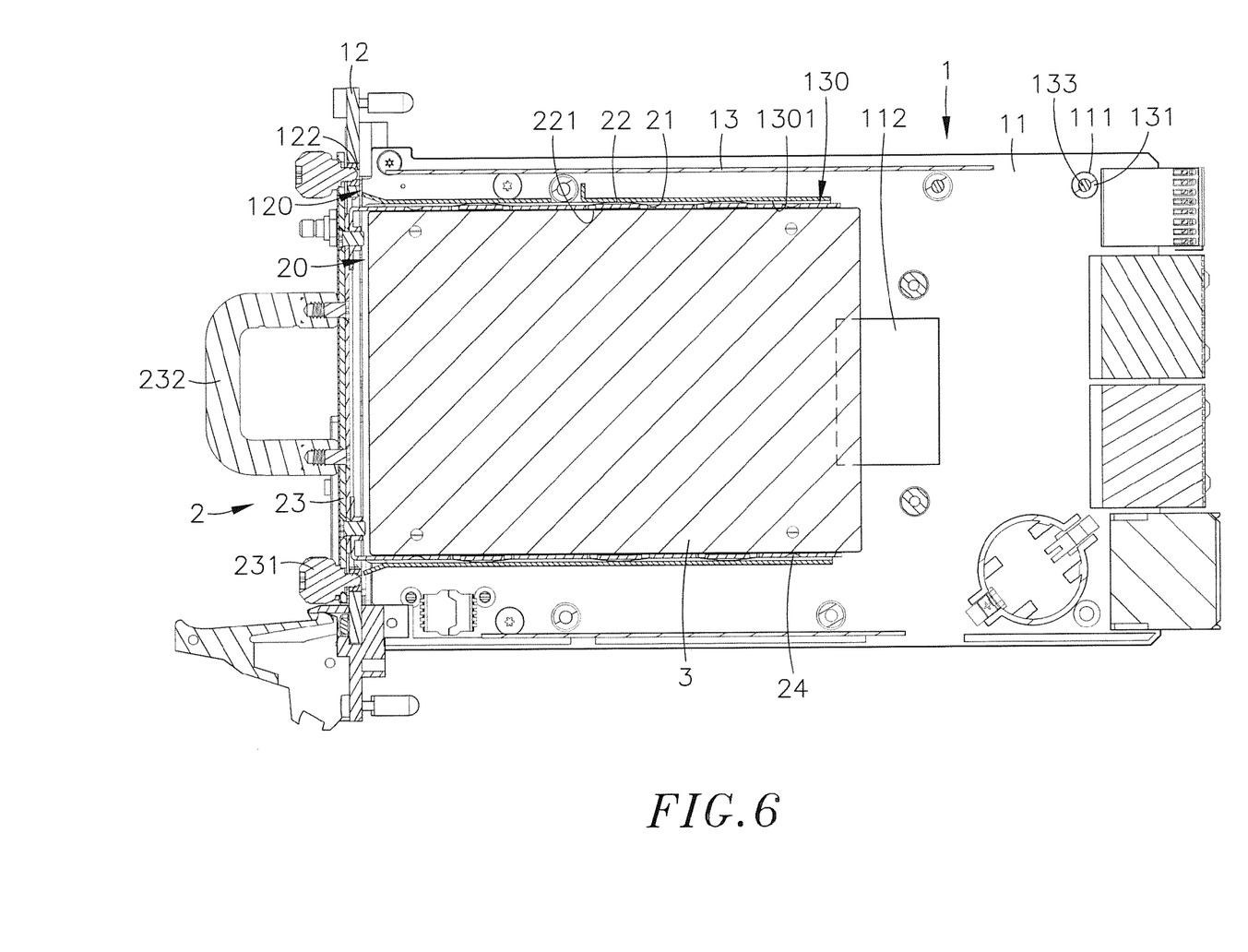
FIG. 6 corresponds to FIG. 5, illustrating the hard disk tray installed in the electrical module.

Referring to FIGS. 5 and 6 and FIGS. 1, 3 and 4 again, after insertion of the hard disk tray 2 with the loaded hard disk 3 through the insertion slot 120 of the face panel 12 into the receiving chamber 130 of the holder box 13, the arched spring plates 22 of the hard disk tray 2 are elastically deformed and forced into friction engagement with the two opposite inner lateral walls 1301 in the receiving chamber 130 of the holder box 13, and at the same time, a connection interface 31 that is located at one end of the hard disk 3 and faces toward a rear open side of the accommodation open chamber 20 of the hard disk tray 2 is connected to a mating connection interface 112 at an opposite rear end of the circuit board 11 of the of the electrical module 1. Thus, the hard disk 3 is electrically linked to the electrical module 1. Further, the connection interface 31 of the hard disk 3 can be a male electrical connector, and the mating connection interface 112 of the circuit board 11 can be a mating female electrical connector.

Further, after installation of the electrical module 1 in a computer, the transmission interfaces 121 of the face panel 12 are electrically connected to respective mating adapter interfaces of the computer, allowing signal transmission between the hard disk 3 and the computer via the electrical module 1. When hoping to replace the hard disk 3, the user can loosen the hand screws 231 of the hard disk tray 2 from the respective locating screw holes 122 of the face panel 12 to unlock the hard disk tray 2 from the face panel 12 of the electrical module 1, and then pull the handle 232 to separate the hard disk tray 2 from the holder box 13 of the electrical module 1. Through the handle 232, the user can insert the hard disk tray 2 into the holder box 13 of the electrical module 1 or pull the hard disk tray 2 out of the holder box 13 of the electrical module 1 conveniently. Further, after insertion of the hard disk tray 2 into the holder box 13 of the electrical module 1, the user can thread the hand screws 231 of the hard disk tray 2 into the locating screw holes 122 of the face panel 12 to lock the hard disk tray 2 to the face panel 12 of the electrical module 1 conveniently with the fingers without any hand tool. Thus, the invention facilitates hard disk mounting and dismounting.

As stated above, the invention provides a mobile hard disk drive comprising an electrical module 1 and a hard disk tray 2, wherein the electrical module 1 comprises a circuit board 11, a face panel 12 connected to a front end of the circuit board 11 at right angles and providing an insertion slot 120 and two locating screw holes 122 and a holder box 13 mounted at one side of the circuit board 11 by spacer columns 131 and screws 133 and defining therein a receiving chamber 130 in communication with the insertion slot 120 of the face panel 12, and a hard disk tray 2 adapted for holding a hard disk 3 in an accommodation open chamber 20 thereof and detachably insertable through the insertion slot 120 into the receiving chamber 130 and having arched spring plates 22 located at two opposite lateral sides thereof for friction engagement with the two opposite inner lateral walls 1301 in the receiving chamber 130 of the holder box 13 and two hand screws 231 for threading into the respective locating screw holes 122 of the face panel 12 to lock the hard disk tray 2 to the face panel 12 of the electrical module 1.

In conclusion, the invention provides a mobile hard disk drive, which comprises electrical module 1 that comprises a circuit board 11, a face panel 12 and a holder box 13, and a hard disk tray 2 detachably insertable through an insertion slot 120 in the face panel 12 into a receiving chamber 130 in the holder box 13 to force arched spring plates 22 thereof into friction engagement with the two opposite inner lateral walls 1301 in the receiving chamber 130 of the holder box 13 and lockable to the face panel 12 by two hand screws 231 that are mounted at the end plate 23 of the hard disk tray 2 for threading into respective locating screw holes 122 at the face panel 12 to lock the hard disk tray 2 to the face panel 12 of the electrical module 1.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A mobile hard disk drive, comprising:
    an electrical module comprising a circuit board, a face panel connected to one end of said circuit board, said face panel comprising a plurality of transmission interfaces electrically connected to said circuit board and adapted for connecting to respective external mating interfaces and an insertion slot cut through opposing front and back walls thereof, and a holder box mounted at one side of said circuit board, said holder box defining therein a receiving chamber in communication with said insertion slot of said face panel; and
    a hard disk tray detachably insertable through said insertion slot of said face panel into said receiving chamber of said holder box, said hard disk tray comprising an accommodation open chamber adapted for accommodating a hard disk, and a plurality of arched spring plates symmetrically disposed at two opposite lateral sides thereof and insertable with said hard disk tray through said insertion slot of said face panel into said receiving chamber of said holder box for friction engagement with two opposite inner lateral walls in said receiving chamber of said holder box.

2. The mobile hard disk drive as claimed in claim 1, wherein said circuit board further comprises a plurality of mounting screw holes respectively located in corners thereof; said holder box further comprises a plurality of spacer columns respectively perpendicularly extended from a back side thereof and respectively attached to the mounting screw holes of said circuit board, a plurality of screw holes respectively extended through said spacer columns in communication with the respective mounting screw holes of said circuit board, and a plurality of screws respectively threaded into the screw holes in said spacer columns and the respective mounting screw holes of said circuit board to affix said circuit board and said holder box together.

3. The mobile hard disk drive as claimed in claim 1, wherein said circuit board further comprises connection interface means for the connection of mating connection interface means of a hard disk being mounted in said accommodation open chamber of said hard disk tray.

4. The mobile hard disk drive as claimed in claim 1, wherein said face panel further comprises two locating screw holes respectively disposed at opposing top and bottom sides relative to said insertion slot; said hard disk tray further comprises an end plate located at one end relative to said accommodation open chamber, two hand screws respectively mounted near two distal ends of said end plate and adapted for threading into the locating screw holes of said face panel to lock said hard disk tray to said face panel, and a handle located at said end plate between said two hand screws.

5. The mobile hard disk drive as claimed in claim 1, wherein said hard disk tray further comprises a plurality of hook holes arranged in pairs and symmetrically disposed at two opposite lateral sides relative to said accommodation open chamber for securing said arched spring plates.

6. The mobile hard disk drive as claimed in claim 1, wherein said hard disk tray further comprises multiple pairs of hook holes symmetrically disposed at two opposite lateral sides relative to said accommodation open chamber for securing said arched spring plates; each said arched spring plate comprises two hooked end portions respectively hooked in the two hook holes of one of said pairs of hook holes.

7. The mobile hard disk drive as claimed in claim 1, wherein said hard disk tray further comprises a plurality of mounting screw holes located at the two opposite lateral sides thereof, and a plurality of screws respectively threaded into the mounting screw holes thereof and respective mounting screw holes at two opposite lateral sides of the hard disk being accommodated in said accommodation open chamber of said hard disk tray.

\* \* \* \* \*